United States Patent
Shiga et al.

(10) Patent No.: US 8,229,353 B2
(45) Date of Patent: Jul. 24, 2012

(54) WIRELESS COMMUNICATION SYSTEM, AND PORTABLE TERMINAL APPARATUS

(75) Inventors: Takashi Shiga, Ehime (JP); Tooru Aoki, Ehime (JP)

(73) Assignee: Panasonic Corporation, Osaka (JP)

(*) Notice: Subject to any disclaimer, the term of this patent is extended or adjusted under 35 U.S.C. 154(b) by 325 days.

(21) Appl. No.: 12/664,184

(22) PCT Filed: Dec. 15, 2008

(86) PCT No.: PCT/JP2008/003759
§ 371 (c)(1),
(2), (4) Date: Dec. 11, 2009

(87) PCT Pub. No.: WO2009/084163
PCT Pub. Date: Jul. 9, 2009

(65) Prior Publication Data
US 2010/0184478 A1    Jul. 22, 2010

(30) Foreign Application Priority Data
Dec. 27, 2007 (JP) .................. 2007-336253

(51) Int. Cl.
*H04B 7/24* (2006.01)
(52) U.S. Cl. ............... 455/39; 455/24; 455/8; 455/522; 370/311; 370/328
(58) Field of Classification Search .................. 455/411, 455/426.1, 458, 515, 39, 24, 8, 522; 340/7.44, 340/539.11; 370/311, 328
See application file for complete search history.

(56) References Cited

U.S. PATENT DOCUMENTS

| 5,175,874 | A | | 12/1992 | Auchter |
| 5,765,104 | A | * | 6/1998 | Kushita ...................... 455/343.3 |
| 5,835,023 | A | * | 11/1998 | Ito et al. ...................... 340/7.35 |
| 6,304,761 | B1 | * | 10/2001 | Tsunehiro .................... 340/7.32 |
| 6,370,111 | B1 | * | 4/2002 | Takeda et al. ................ 370/216 |
| 6,614,797 | B1 | * | 9/2003 | Hippelainen ................ 370/410 |
| 7,590,121 | B2 | * | 9/2009 | de Mier ........................ 370/394 |
| 7,899,401 | B2 | * | 3/2011 | Tanaka et al. ............. 455/67.11 |
| 2003/0069614 | A1 | * | 4/2003 | Bowman et al. ............... 607/60 |
| 2004/0046991 | A1 | * | 3/2004 | Kim ............................ 358/1.15 |

(Continued)

FOREIGN PATENT DOCUMENTS

EP   0 473 465   3/1992

(Continued)

OTHER PUBLICATIONS

International Search Report issued Jan. 13, 2009 in International (PCT) Application No. PCT/JP2008/003759.

(Continued)

*Primary Examiner* — Kamran Afshar
*Assistant Examiner* — Mong-Thuy Tran
(74) *Attorney, Agent, or Firm* — Wenderoth, Lind & Ponack, L.L.P.

(57) ABSTRACT

Provided is a handset comprising a transceiver transmitting and receiving data to and from a base, a data error detector determining whether or not there is an error in the data received by the transceiver, and a reception duration controller changing a specific reception duration. If the data error detector determines that there is an error, then the reception duration controller extends a reception duration of the transceiver so as to receive the data newly sent from the base and to reduce unnecessary calling repetitions between the base and the handset and reduce wasted waiting time.

9 Claims, 12 Drawing Sheets

U.S. PATENT DOCUMENTS

| | | |
|---|---|---|
| 2004/0162046 A1* | 8/2004 | Yamauchi et al. ............ 455/260 |
| 2004/0185820 A1* | 9/2004 | Ogura ........................ 455/343.1 |
| 2004/0193756 A1* | 9/2004 | Kamada et al. ................. 710/22 |
| 2005/0030918 A1* | 2/2005 | Motegi et al. ................. 370/328 |
| 2005/0157671 A1* | 7/2005 | Sugitani ........................ 370/324 |
| 2005/0229071 A1* | 10/2005 | Uga ............................ 714/748 |
| 2005/0286422 A1* | 12/2005 | Funato ......................... 370/235 |
| 2006/0008276 A1* | 1/2006 | Sakai et al. .................. 398/141 |
| 2006/0221781 A1* | 10/2006 | Suzuki ....................... 369/32.01 |
| 2007/0121494 A1* | 5/2007 | Kobayashi et al. ........... 370/229 |
| 2007/0140153 A1 | 6/2007 | Kono |
| 2007/0155323 A1* | 7/2007 | Matsumoto et al. ............ 455/39 |
| 2007/0205868 A1* | 9/2007 | Tanaka ........................ 340/10.2 |
| 2007/0259629 A1* | 11/2007 | Lee et al. .................. 455/127.1 |
| 2009/0073907 A1* | 3/2009 | Cai ............................. 370/311 |
| 2009/0161587 A1* | 6/2009 | Ishii et al. ..................... 370/311 |

FOREIGN PATENT DOCUMENTS

| | | |
|---|---|---|
| EP | 1 942 587 | 7/2008 |
| JP | 8-149560 | 6/1996 |
| JP | 9-247729 | 9/1997 |
| JP | 10-242903 | 9/1998 |
| JP | 11-17581 | 1/1999 |
| JP | 2001-109978 | 4/2001 |
| JP | 2002-251461 | 9/2002 |
| JP | 2006-339893 | 12/2006 |
| WO | 01/80475 | 10/2001 |
| WO | 2007/049698 | 5/2007 |

OTHER PUBLICATIONS

Supplementary European Search Report mailed May 7, 2012 in corresponding European Application No. 08 86 8281.

* cited by examiner

WIRELESS COMMUNICATION SYSTEM, AND PORTABLE TERMINAL APPARATUS

TECHNICAL FIELD

The present invention relates to a wireless communication system and a portable terminal apparatus for performing intermittent reception.

BACKGROUND ART

Technology has been disclosed in which a portable terminal apparatus for wirelessly communicating with a measurement device such as a blood sugar meter or a manometer sends data acquired from the measurement device through a network to a data processing apparatus at a medical facility or the like (see Patent Document 1, for example).

A wireless communication system used between a measurement device such as this (hereinafter referred to as a base) and a portable terminal apparatus (hereinafter referred to as a handset) have been disclosed in which a handset on the receiving side performs intermittent reception (see Patent Document 2, for example). Wireless communication between a base and a handset in a conventional wireless communication system will be described through reference to FIG. 12.

The base continuously sends a call signal for communicating with the handset for a specific call time T1. The handset performs intermittent reception at a specific call check interval T4, in which reception of a call signal from the base is awaited for a call check time T3. If a call signal is received from the base, the handset checks for errors in the received data, and if there are no errors in the received data, a response completion signal is sent to the base at a response check time T2 of the base. On the other hand, if there is an error in the received data (100 in FIG. 12), the handset does not send a response completion signal to the base. In this case, the base provides T1 again after T2, and continuously sends a call signal. The handset receives the call signal again and checks for errors at the call check time T3 corresponding to this call time T1. As long as there is an error in the received data, the handset repeats this operation, and if the received data is OK (101 in FIG. 12), sends a response completion signal to the base.

Patent Document 1: Japanese Laid-Open Patent Application 2002-251461 (published on Sep. 6, 2002)

Patent Document: Japanese Laid-Open Patent Application 2001-109978 (published on Apr. 20, 2001)

DISCLOSURE OF INVENTION

With a wireless communication system such as this, errors in the data received by the handset can be caused by disturbance factors such as when a call signal from the base temporarily collides with other wireless data, or there is degradation of the reception level of the wireless radio waves that reach the handset. With prior art, the base would transmit the data again, matching to the next reception timing of the handset. If the intermittent reception interval of the handset is long, however, the waiting time becomes longer, so communication ends up taking a long time to be completed.

In view of this, it is an object of the present invention to shorten the time it takes from the start of communication until its completion in wireless communication.

To solve the above-mentioned problems encountered in the past, the wireless communication system pertaining to a first aspect of the invention comprises a first device configured to repeatedly transmit data within a specific transmission time, and a second device configured to perform intermittent reception by repeating a specific reception duration at a constant period in order to receive the data from the first device. The second device additionally has a transceiver configured to transmit and receive the data to and from the first device, a data error detector configured to determine whether or not there is an error in the data received by the transceiver, and a reception duration controller configured to change the specific reception duration. If the data error detector has determined that there is an error, the reception duration controller extends a reception duration of the transceiver so as to receive the data that is newly sent from the first device.

Here, if there is an error in the received data, the communication waiting time can be shortened by actively creating a state in which the next data can be received.

The wireless communication system pertaining to a second aspect of the invention comprises a first device configured to repeatedly transmit the data within a specific transmission time, and a second device configured to perform intermittent reception by repeating a specific reception duration at a constant period in order to receive the data from the first device. The second device has a transceiver configured to transmit and receive data to and from the first device, a packet data number confirmation component, a packet data number comparator, an extension time calculator, and a reception duration controller. The packet data number confirmation component confirms the number of a plurality of packet data included in the data received by the transceiver. The packet data number comparator compares the number of the packet data received by the transceiver with a total number of packet data to be sent out from the first device in a single transmission. The extension time calculator calculates an extension time of the reception duration of the transceiver on the basis of the comparison result of the packet data number comparator. The reception duration controller extends the specific reception duration according to the extension time.

Here, "packet data" refers to data obtained by dividing the data sent in a single transmission from the first device into a specific size.

Here, the necessary extension time can be dynamically calculated according to the data transmission status, the reception duration can be extended, and the reception duration can be set to the minimum, which means that the power consumption of the second device (such as a handset) can be reduced.

The wireless communication system pertaining to a third aspect of the invention is the wireless communication system pertaining to the first or second aspect, wherein the second device further has a data detector configured to detect whether or not the transceiver has received the data from the first device, and a timeout determiner configured to output a timeout signal to the reception duration controller if the data detector does not detect a reception of the data for at least a specific time. The reception duration controller additionally outputs a signal that ends the reception operation to the transceiver when the timeout signal is inputted.

Here, wasted waiting time in communication can be cut down by ending the reception operation with a timeout signal.

The wireless communication system pertaining to a fourth aspect of the invention is the wireless communication system pertaining to the second aspect, wherein the second device further has a data error detector configured to determine whether or not there is an error in the data received by the transceiver. If the data error detector has determined that there is an error, the reception duration controller changes the reception duration of the transceiver so as to receive the data that is newly sent from the first device.

Here, in addition to the necessary extension time being dynamically calculated according to the data transmission status, a state in which the next data can be received is actively created if there is an error in the received data, which means that the communication waiting time can be shortened.

The wireless communication system pertaining to a fifth aspect of the invention is the wireless communication system pertaining to the second aspect, wherein the reception duration controller sets the reception duration of the transceiver to a value that is the same as a transmission interval for the data sent from the first device.

Here, the reception duration can be set to the minimum by setting the reception duration to a value that is the same as the transmission interval for the data sent from the first device.

The wireless communication system pertaining to a sixth aspect of the invention is the wireless communication system pertaining to the second aspect, wherein the extension time calculator of the second device calculates the extension time from the difference between the total number of packet data and the number of the packet data received by the transceiver, and from a transfer rate between the first device and the second device.

The portable terminal apparatus pertaining to a seventh aspect of the invention comprises a transceiver, a data error detector, and a reception duration controller. The transceiver performs intermittent reception by repeating a specific reception duration at a constant period in order to receive data from a measurement device that repeatedly transmits the data within a specific transmission time. The data error detector determines whether or not there is an error in the data received by the transceiver. The reception duration controller changes the specific reception duration. If the data error detector has determined that there is an error, the reception duration controller additionally extends the reception duration so as to receive the data that is newly sent from the measurement device.

The portable terminal apparatus pertaining to an eighth aspect of the invention comprises a transceiver, a packet data number confirmation component, a packet data number comparator, an extension time calculator, and a reception duration controller. The transceiver performs intermittent reception by repeating a specific reception duration at a constant period in order to receive data from a measurement device that repeatedly transmits the data within a specific transmission time. The packet data number confirmation component confirms the number of a plurality of packet data included in the data received by the transceiver. The packet data number comparator compares the number of the packet data received by the transceiver with a total number of packet data to be sent out from the measurement device in a single transmission. The extension time calculator calculates an extension time of a reception duration of the transceiver on the basis of the comparison result of the packet data number comparator. The reception duration controller extends the specific reception duration according to the extension time.

With the wireless communication system and the portable terminal apparatus of the present invention, it is possible to shorten the time it takes from the start of communication until its completion in wireless communication.

Figure 1:
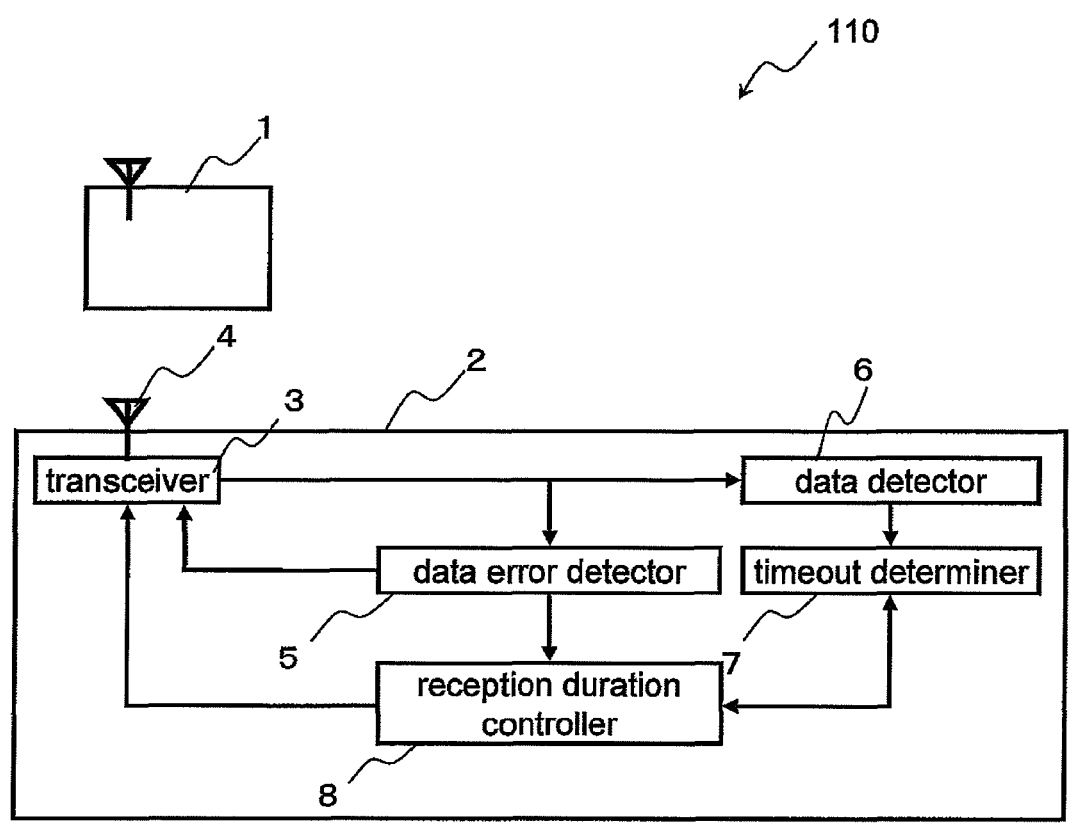
FIG. 1 is a diagram of the constitution of the wireless communication system in Embodiment 1 of the present invention.

EXPLANATION OF REFERENCE 1 base (first device, measurement device)
2 handset (second device, portable terminal apparatus)
3 transceiver
4 antenna
5 data error detector
6 data detector
7 timeout determiner
8 reception duration controller
10 data detection signal
11 reception period
12 counter value
13 threshold
14 reception stop request signal
15 error data
16 proper data
17 response waiting state
18, 19 error data
50 handset
51 packet data number confirmation component
52 packet data number comparator
53 extension time calculator
54 reception duration controller
55 data storage region
60 error data
61 proper data
100 error data 101 proper data
110, 210 wireless communication system

BEST MODE FOR CARRYING OUT THE INVENTION

Embodiments of the wireless communication system of the present invention will now be described in detail through reference to the drawings.

Embodiment 1

FIG. 1 is a diagram of the constitution of the wireless communication system 110 in Embodiment 1 of the present invention.

The wireless communication system 110 pertaining to this embodiment comprises a base 1 (first device) and a handset 2 (second device) that communicates wirelessly with the base 1.

Base 1

The base 1 is, for example, a wireless blood sugar meter that measures a blood sugar value and sends this measurement data by wireless communication. The base 1 has a measurement component (not shown) for measuring a blood sugar value, and a transceiver (not shown) for sending this measurement data. The base 1 here is not limited to one that measures blood sugar values, and may instead be one that measures cholesterol values or other such biological information, or blood pressure, body weight, and other such health management data.

Figure 12:
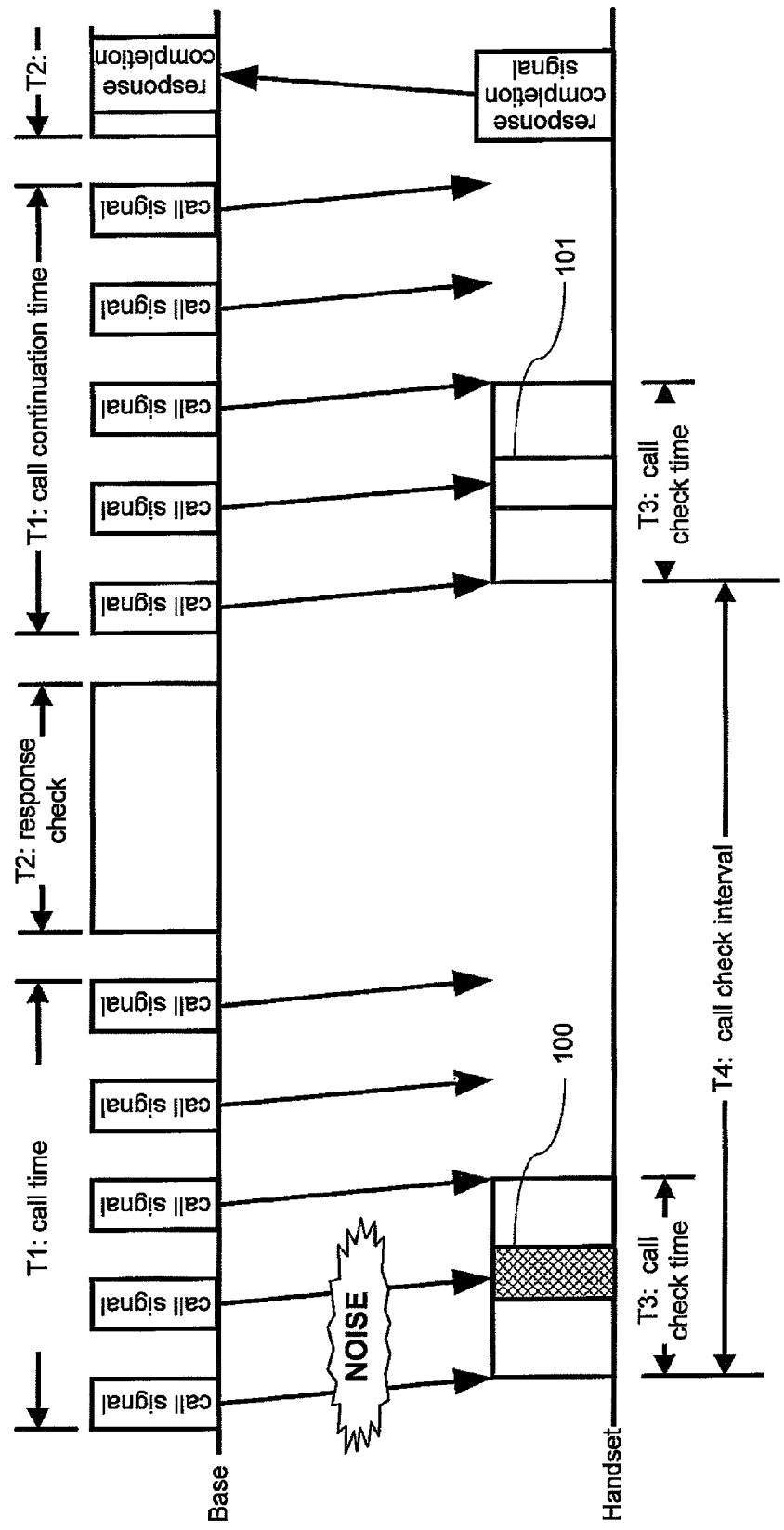
FIG. 12 is a time chart for wireless communication between a base and a handset with a conventional wireless communication system.

Upon receiving a request for measurement data transmission from the measurement component, the transceiver of the base 1 produces and sends transmission data by subjecting the measurement data to specific processing for modulation. More specifically, just as with the operation of the base shown in FIG. 12, the base 1 sends transmission data a plurality of times for a specific call time (corresponds to T1 in FIG. 12), after which it waits for a response from the handset 2 for a specific response waiting time (corresponds to T2 in FIG. 12). If a response completion signal is received from the handset 2 during the response waiting time, the wireless communication is completed, but if there is no response from the handset 2 during the response waiting time, a call time is provided again and the same transmission data is resent. The base 1 pertaining to this embodiment differs from the base shown in FIG. 12, which sends a simple call signal, in that it sends transmission data obtained by processing the measurement data.

The base 1 is a measurement device that includes, for example, a communication circuit constituting a transceiver, a measurement circuit constituting a data measurement component, and a CPU that performs circulation and control processing and is connected to these circuits and to an EEPROM or another such memory circuit, a switch or another such operation component, and a liquid crystal monitor or another such display component.

Handset 2

The handset 2 is, for example, a portable terminal apparatus in which measurement data taken out of the transmission data sent from the base is stored by category, and which allows the user to check graphic displays, indexes, and so forth, or to send the stored measurement data through a network to a medical facility or the like. The wireless communication blocks of the handset 2 will now be described through reference to FIG. 2.

The handset 2 has a transceiver 3, an antenna 4, a data error detector 5, a data detector 6, a timeout determiner 7, and a reception duration controller 8.

Figure 2:
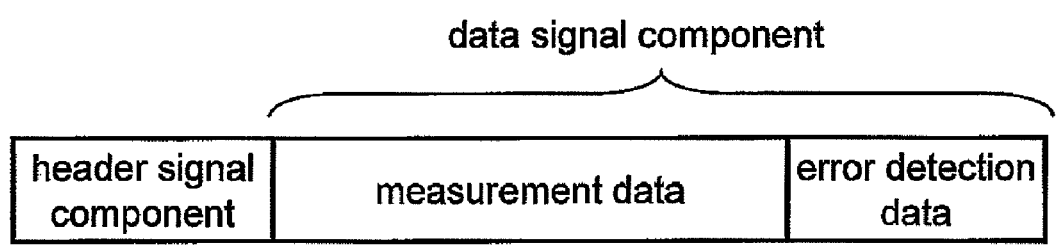
FIG. 2 is a diagram of the constitution of the data included in the transmission data of the wireless communication system in Embodiment 1 of the present invention.

The transceiver 3 receives from the antenna 4 the modulated transmission data sent by the base 1, and converts the analog signal into a digital signal by binary conversion. As shown in FIG. 2, the digital signal thus produced includes a data signal component and a header signal component for identifying the transmission data. The transceiver 3 also sends the base 1 a response completion signal in the event of successful reception of transmission data from the base 1.

The data error detector 5 decodes the data signal component of the transmission data and checks the decoded data for errors.

The data detector 6 monitors the head signal component of the transmission data and detects whether or not what the antenna 4 has received is transmission data.

The timeout determiner 7 has a counter, which counts how long transmission data has not been detected by the data detector 6. The timeout determiner 7 begins counting upon receipt of a signal to start reception from the reception duration controller 8. The timeout determiner 7 outputs a timeout signal if no transmission data is detected after a specific time count.

The reception duration controller 8 controls the reception operation of the transceiver 3 according to the signals outputted from the data error detector 5 and the timeout determiner 7. As described below, this control over the reception operation includes starting intermittent reception, extending the reception duration, generating a reception end signal and outputting it to the transceiver 3, and so forth.

FIG. 2 is a diagram of the constitution of the transmission data sent from the base 1. As shown in FIG. 2, the transmission data has a header signal component and a data signal component, and the data signal component is produced by encoding measurement data and error detection data. At the base 1, the transmission data is thus produced by processing the measurement data Next, the operation of the various portions of the handset 2 shown in FIG. 1 will be described in specific terms.

First, as described above, the transceiver 3 receives and digitally encodes the transmission data sent from the base 1. Then, the digital signal thus produced is outputted to the data error detector 5 and to the data detector 6. The data error detector 5 reads the data signal component from the inputted digital signal, and decodes measurement data and error detection data.

Next, the data error detector 5 uses the error detection data to check the measurement data for errors. If an error is detected in the measurement data, the data error detector 5 outputs a reception duration extension request signal to the reception duration controller 8. If no errors are detected in the measurement data, the data error detector 5 outputs a response completion signal to the transceiver 3, and the transceiver 3 sends the response completion signal to the base 1.

Meanwhile, the data detector 6 decodes a signal corresponding to the header signal component of the digital signal outputted from the transceiver 3. If this decoded data matches a pattern characteristic of the header signal component, it is determined that data has been detected, and a data detection signal 10 (FIG. 3) is outputted to the timeout determiner 7.

Figure 3:
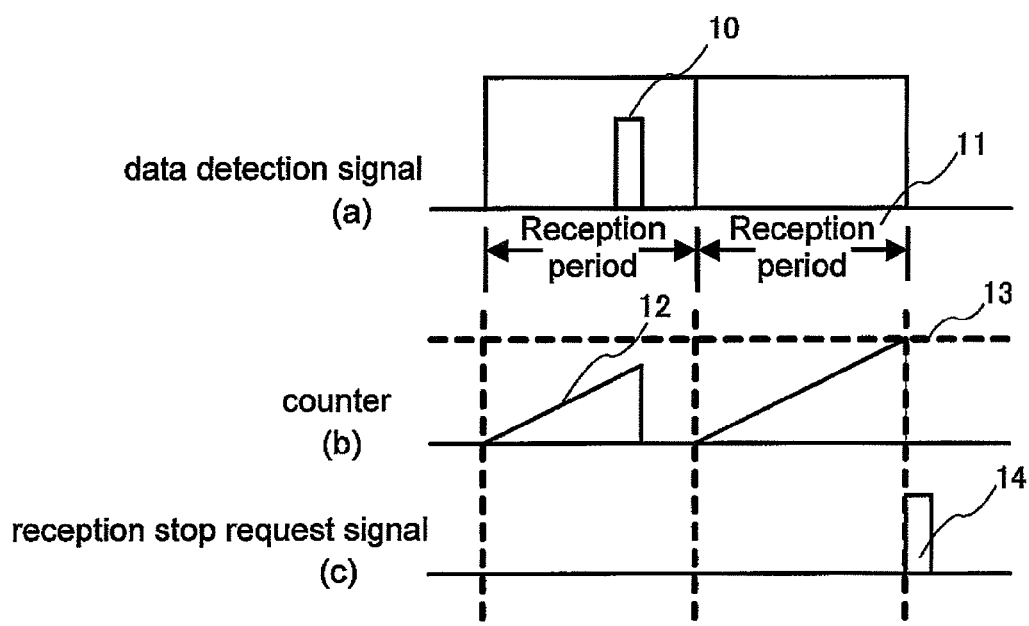
FIG. 3 is a timing chart related to output signals with the wireless communication system in Embodiment 1 of the present invention.

FIG. 3 is a timing chart related to the signal output of the data detector 6 and the timeout determiner 7. FIG. 3 shows examples of when transmission data was received from the base 1 and when no transmission data was received from the base 1 within a reception period 11. FIG. 3(a) shows the state of the data detection signal 10 outputted by the data detector 6, and FIG. 3(b) shows a counter value 12 in the timeout determiner 7 and a threshold 13 for determining that transmission data was not received within the reception period 11. FIG. 3(c) shows a reception stop request signal 14, that is, a timeout signal, outputted by the timeout determiner 7.

As shown in FIG. 3, the timeout determiner 7 begins incrementing the count of the counter upon receiving a count start request signal outputted from the reception duration controller 8 at the start of the reception period 11. The timeout determiner 7 resets the counter upon receipt of the data detection signal 10 from the data detector 6 during the reception period 11. Or, if the counter value exceeds the specific threshold 13, the timeout determiner 7 determines that no transmission data was received during the reception period 11, and outputs the reception stop request signal 14 to the reception duration controller 8.

The reception duration controller 8 inputs the reception duration extension request signal outputted by the data error detector 5 and the reception stop request signal 14 outputted by the timeout determiner 7 to extend the reception duration, or outputs a reception stop request to the transceiver 3. The reception duration controller 8 holds an initial value for the reception duration or the reception period in intermittent reception, and outputs reception start and end requests at specific timings to the transceiver 3. The reception duration controller 8 outputs a count start request signal to the timeout determiner 7 at the start of reception.

The handset 2 is a portable terminal apparatus that includes, for example, a communication circuit that constitutes the transceiver 3; the antenna 4; a CPU that constitutes the data error detector 5, the data detector 6, the timeout determiner 7, and the reception duration controller 8; and a ROM or other such storage component that stores programs for executing the functions of these portions.

Operation of Wireless Communication System 110

Figure 4:
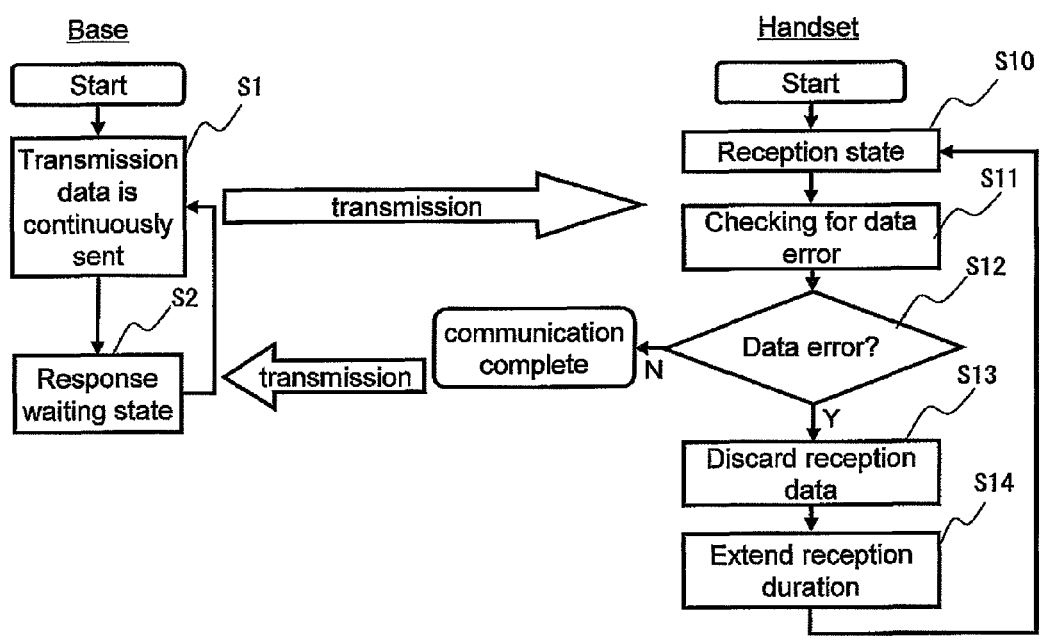
FIG. 4 is a flowchart during wireless communication between a base and a handset with the wireless communication system in Embodiment 1 of the present invention.

FIG. 4 is a flowchart during wireless communication between the base 1 (left side) and the handset 2 (right side) of a wireless communication system in Embodiment 1 of the present invention.

In FIG. 4, the base 1 continuously sends transmission data in the transmission of measurement data to the handset 2 (S1). The base 1 continuously sends transmission data during a specific call time, after which there follows for a specific length of time a response waiting state for receiving a response from the handset 2 (S2). If there is no response from the handset 2 during this response waiting state, transmission data is once again sent continuously. If there is a response from the handset 2, communication completion is confirmed and communication is ended.

Meanwhile, the handset 2 awaits receipt of transmission data from the base 1 in an intermittent reception state (S10). Upon receiving transmission data from the base 1, the handset 2 decodes the data signal component of the transmission data as described above, and uses error detection data to find if there are errors in this data (S11). To find these errors, CRC (cyclic redundancy check) is used as error detection data to find any errors in the measurement data.

If an error is detected in the received measurement data in this process (S12), all of the received data is discarded (S13), the reception duration is extended (S14), and transmission data from the base 1 is awaited once more. Here, the extended reception duration is set to be long enough for transmission data to be acquired from the base 1.

Figure 5:
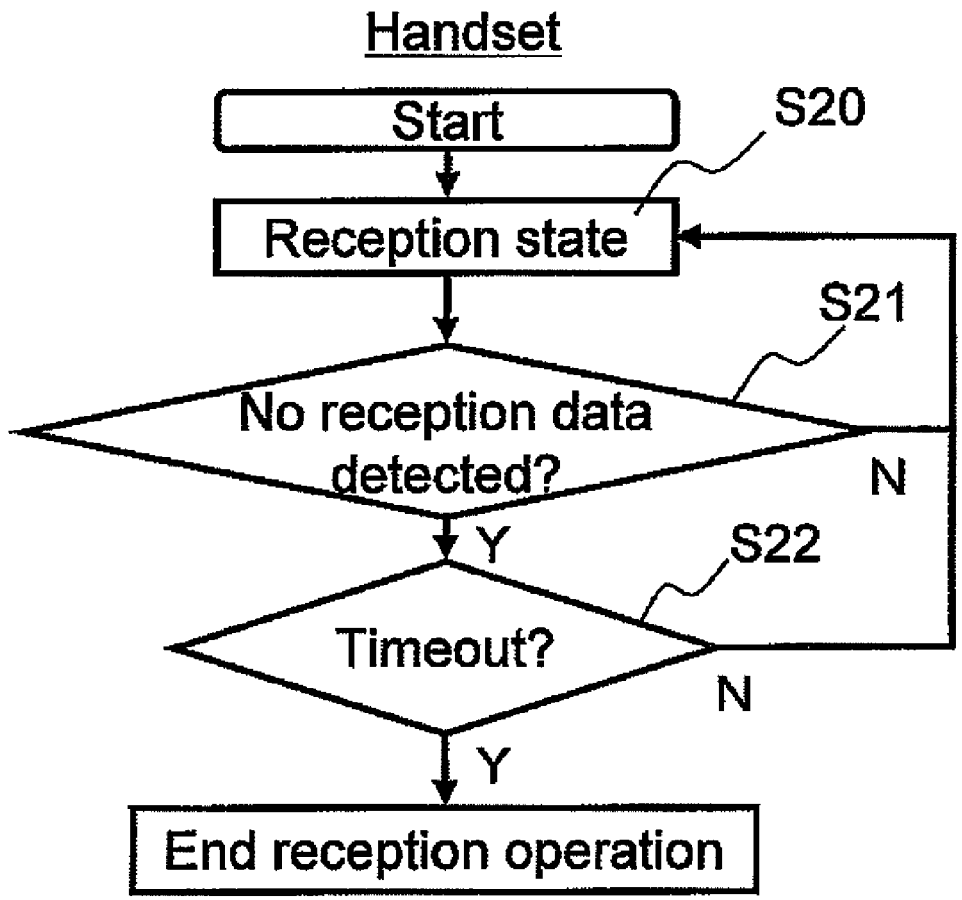
FIG. 5 is a flowchart for the handset during wireless communication between a base and a handset with the wireless communication system in Embodiment 1 of the present invention.

FIG. 5 shows in detail the reception state of the handset 2 in S10 shown in FIG. 4. As shown in FIG. 3, the timeout determiner 7 counts with a counter, and if the handset 2 is in a reception state (S20) and the state of no reception data being detected (S21) has continued for at least a specific length of time, a timeout is determined (S22) and the reception operation is ended.

Figure 6:
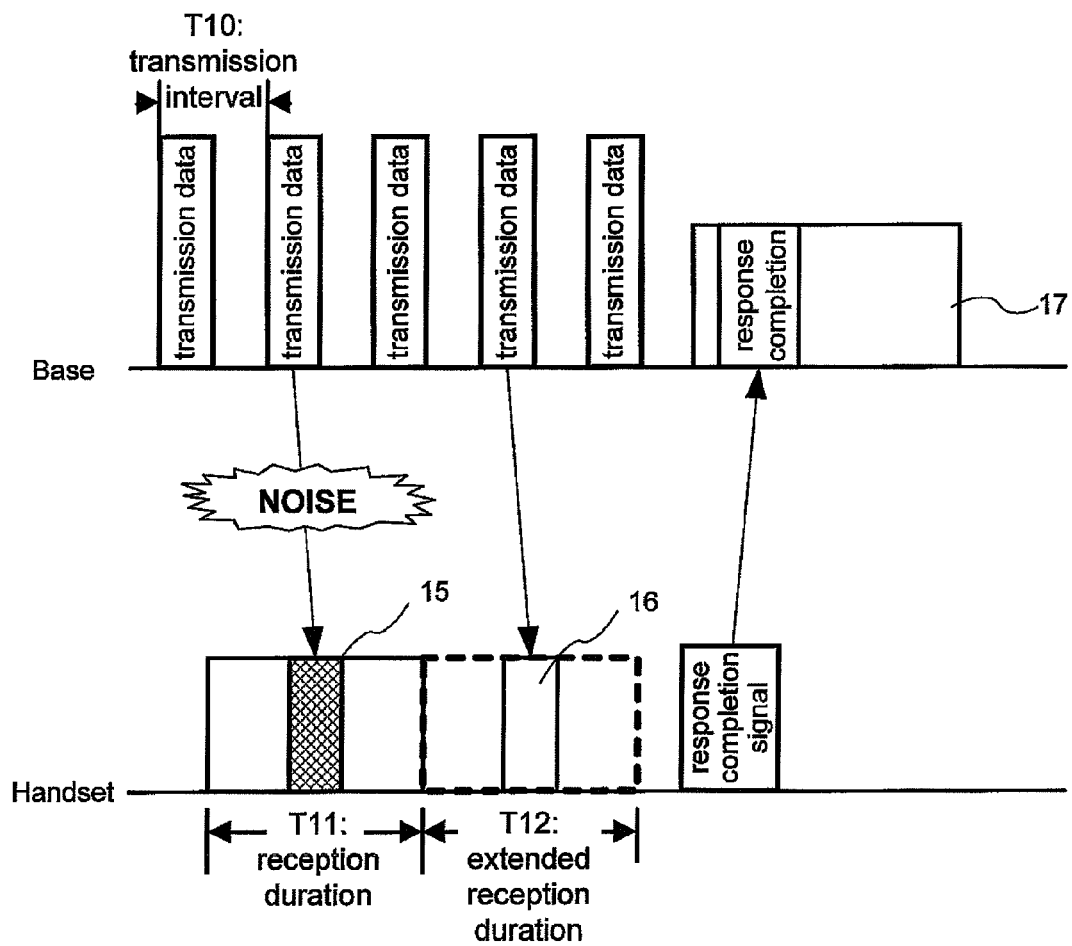
FIG. 6 is a time chart illustrating the transmission of transmission data by the base and the handset reception operation with the wireless communication system in Embodiment 1 of the present invention.
Figure 7:
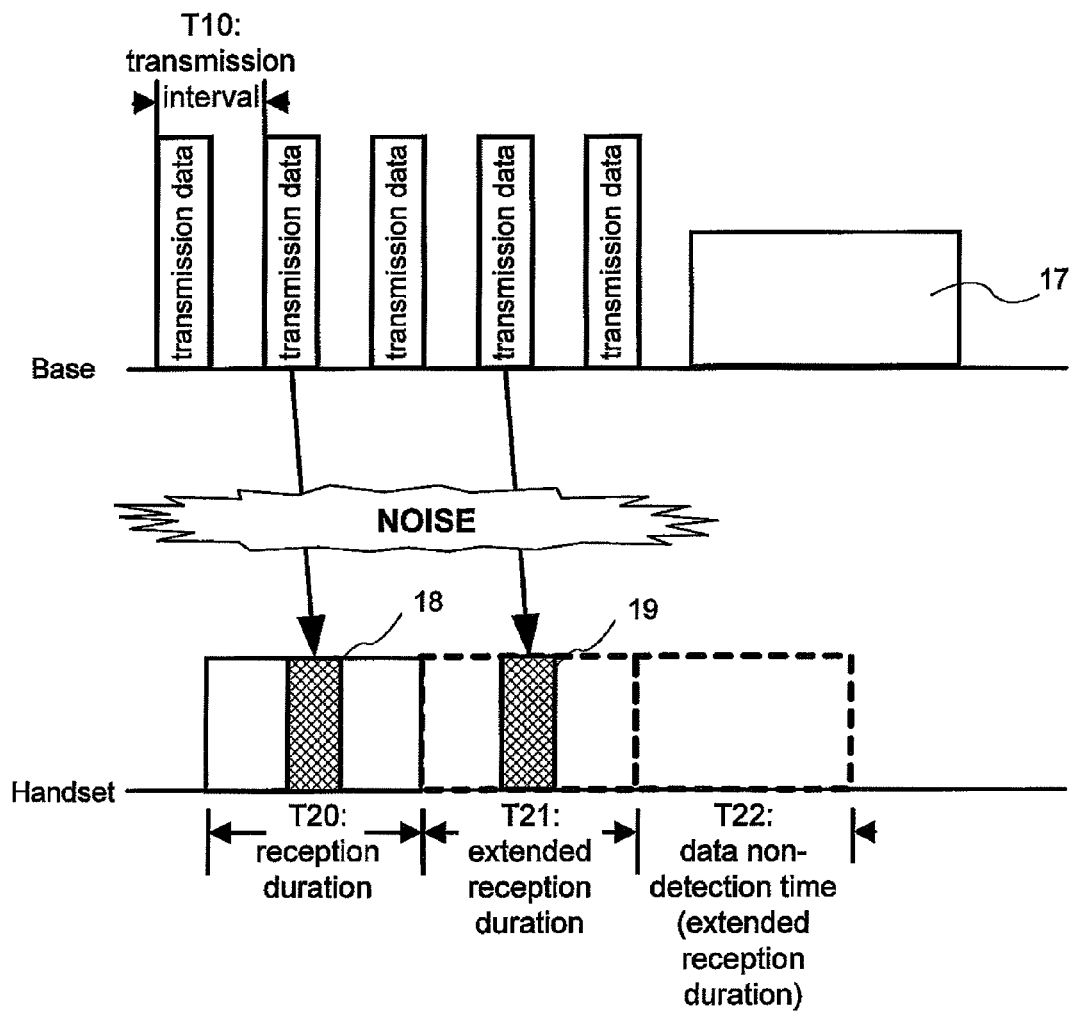
FIG. 7 is a time chart illustrating the transmission of transmission data by the base and the handset reception operation with the wireless communication system in Embodiment 1 of the present invention.

FIGS. 6 and 7 are time charts illustrating the reception operation of the handset 2 and the transmission of transmission data by the base 1 in the wireless communication system 110 in Embodiment 1 of the present invention.

FIG. 6 shows a case in which an error 15 was detected by the data error detector 5 in the received data due to noise or another such factor.

Let us assume that noise was generated when the base 1 transmitted the transmission data and the transmission data was received by the handset 2 within the reception duration T11 of the intermittent reception. The data error detector 5 of the handset 2 detects the error 15 in this received data. The reception duration controller 8 of the handset 2 produces a reception duration extension request signal according to the error detection signal of the data error detector 5, and outputs it to the transceiver 3. Consequently, a new reception duration T12 is added and the reception duration is extended (as shown by the broken line portion in FIG. 6), and the handset 2 enters a state of being able to receive the transmission data from the base 1 again. The extended reception duration T12 is at least twice as long as the transmission interval T10 of the transmission data from the base 1, for example.

If the data error detector 5 of the handset 2 detects the proper data 16, with no errors in the received data during the extended reception duration T12, a response completion signal is sent through the transceiver 3 to the base 1, which is in a response waiting state 17.

FIG. 7 shows a case in which the data 18 and 19 received by the handset 2 during the reception duration includes errors caused by noise, and the proper data cannot be obtained even though the extended reception duration T21 is provided. When the call time of the base 1 ends and there has been no transmission data from the base 1, let us assume that the handset 2 adds a reception duration T22, and a state of no reception data having been received has continued for a specific length of time. Here, for example, if the state of no reception data having been detected has continued for an extended reception duration that is twice as long as the transmission interval T10 of the transmission data from the base 1, a timeout signal is outputted by the timeout determiner 7 to the reception duration controller 8. Upon the input of the timeout signal, the reception duration controller 8 outputs a reception end signal to the transceiver 3 and ends the reception operation.

Effect of Embodiment 1

As described above, with Embodiment 1, the transmission data is detected at the handset 2, and either the reception duration is extended or the reception operation is ended according to the result of determining whether there are any errors in the received data, which reduces unnecessary call repetition and waiting time between the base and the handset, so the time it takes from the start to end of communication can be shortened.

Embodiment 2

Figure 8:
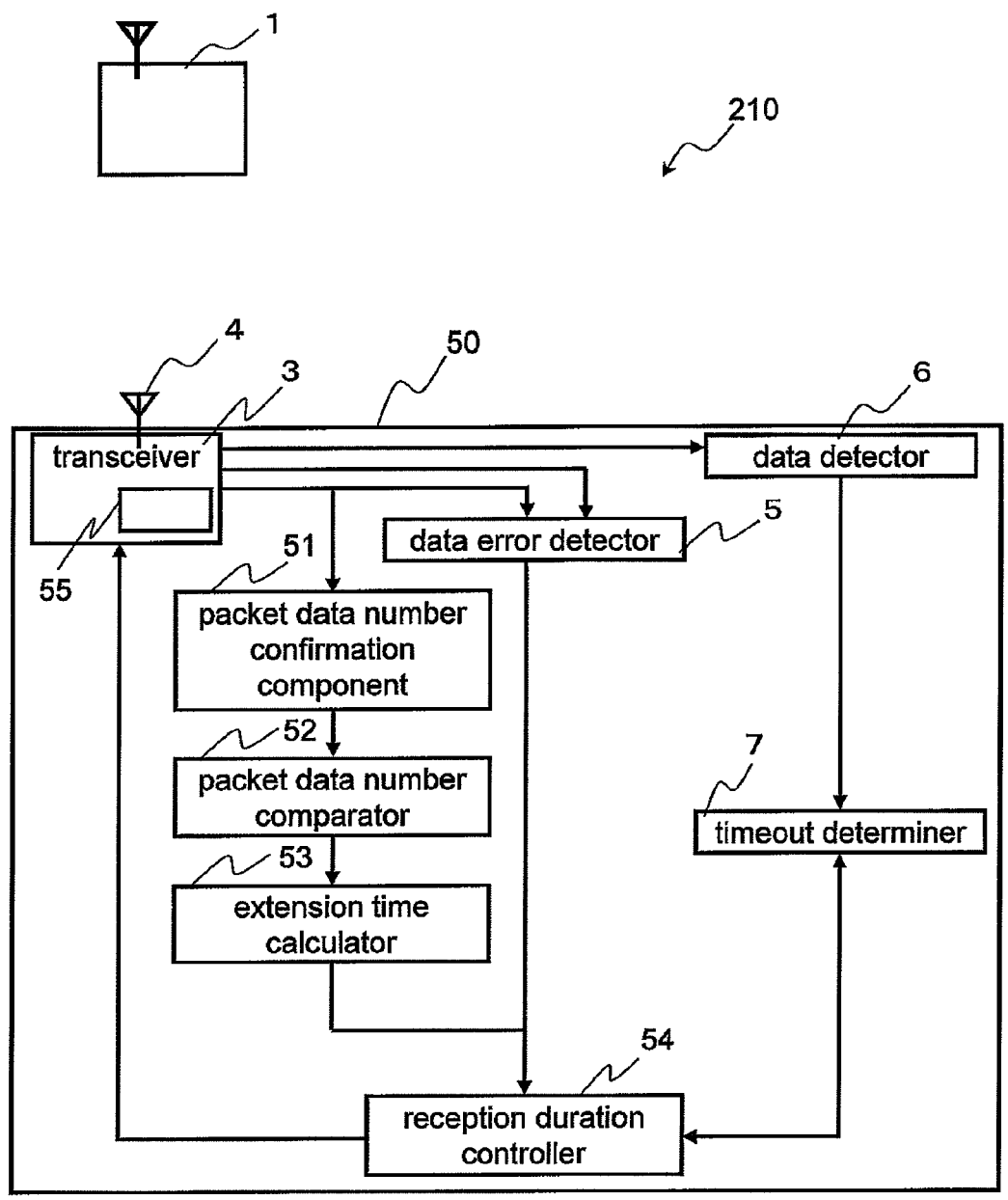
FIG. 8 is a diagram of the constitution of the wireless communication system in Embodiment 2 of the present invention.

FIG. 8 is a diagram of the constitution of the wireless communication system 210 in Embodiment 2 of the present invention. The constitution and functions of the base and handset that were described in Embodiment 1 are labeled with the same numbers and will not be described again.

In the description of Embodiment 2 that follows, "packet" means a portion corresponding to the data signal component out of the transmission data sent from the base 1 (FIG. 2). "Packet data" refers to data which has been divided into a specific size. Therefore, a single packet is made up of a plurality of packet data.

With the wireless communication system 210 pertaining to Embodiment 2, a handset 50 differs from Embodiment 1 in that it has a packet data number confirmation component 51, a packet data number comparator 52, an extension time calculator 53, and a data storage region 55, and that it has a reception duration controller 54 that operates in conjunction with these portions. With the wireless communication system 210 pertaining to Embodiment 2, the reception duration is dynamically extended so that the reception duration of the handset 50 will not end in the midst of the reception of transmission data from the base 1. Providing this function allows the reception duration of the handset 50 to be set to the required minimum.

Handset

The packet data number confirmation component 51 of the handset 50 periodically confirms the packet data number of the transmission data acquired from the transceiver 3, at a specific frequency. The packet data number comparator 52 compares the number of the packet data actually received with a specific packet data total number included in the transmission data from the base 1, and calculates the difference between the number of the acquired packet data and the packet data total number. The calculated difference is sent to the extension time calculator 53, and the required extension time, that is, the extended reception duration, is calculated from this difference and a communication baud rate indicating the transfer rate of wireless communication between the base 1 and the handset 50. The calculated extended reception duration is sent to the reception duration controller 54, and the reception duration is extended. The required extended reception duration is calculated, for example, by dividing the calculated difference by the communication baud rate.

The packet data total number included in the transmission data is determined ahead of time by specifications or the like in this wireless communication system 210. In this case, for example, it is determined by the formula: packet data total number (bytes)=packet transmission time (seconds)×communication rate (bytes/second). The packet data total number may be determined ahead of time, but may instead be determined by the handset 50 which has received the communication rate or the transmission time from the base 1.

Figure 9:
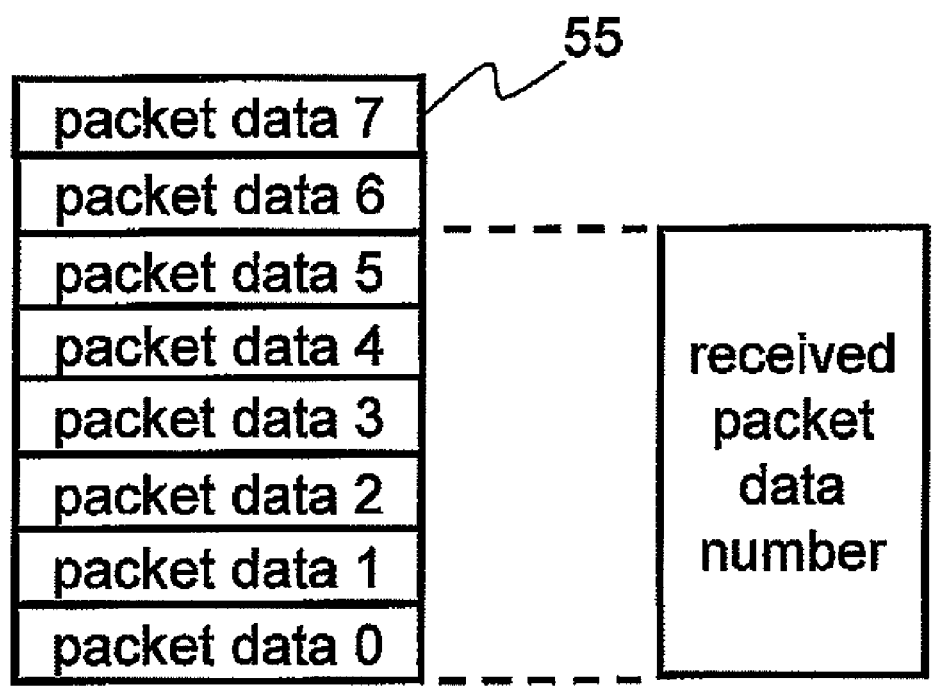
FIG. 9 is a diagram of a data storage region for packet data with the wireless communication system in Embodiment 2 of the present invention.

FIG. 9 shows a state in which a digital signal converted from the transmission data in the transceiver 3 is held in the data storage region 55 provided to the transceiver 3. The packet data number confirmation component 51 confirms the packet data number held in the data storage region 55 at a specific frequency, and outputs this packet data number to the packet data number comparator 52.

For example, let us assume that the size of one packet data is 1 byte, and that the total number of the packet data included in one packet is 8 bytes. When transmission data is received from the base 1, that is, when one packet of data has been received, as shown on the left side in FIG. 9, a total of 8 bytes of packet data are stored in regions 0 to 7 of the data storage region 55. Meanwhile, during confirmation by the packet data number confirmation component 51, if all of the packet data has not been received, such as when only 6 bytes have been received, then as shown on the right side in FIG. 9, the packet data is stored in regions 0 to 5 of the data storage region 55.

The packet data number comparator 52 calculates the difference between the packet data number acquired from the packet data number confirmation component 51 and the packet data total number of the transmission data to be sent all at once from the base 1. In the example on the right side in FIG. 9, the difference is 2 bytes. The value of this difference is sent to the extension time calculator 53.

The extension time calculator 53 calculates the reception duration required to receive the differential number of packet data based on the packet data difference acquired from the packet data number comparator 52 and the communication baud rate of the base 1 and the handset 50. The calculated reception duration is outputted to the reception duration controller 54.

The reception duration controller 54 uses the reception duration to be extended and acquired from the extension time calculator 53 to set the extended reception duration and continue the reception operation in the transceiver 3. Also, the reception duration controller 54 holds the initial values for the reception duration and the reception period in intermittent reception, and outputs reception start and end requests to the transceiver 3 at specific timings. Furthermore, at the start of reception, a count start request signal is outputted to the timeout determiner 7.

Operation of Wireless Communication System 210

Figure 10:
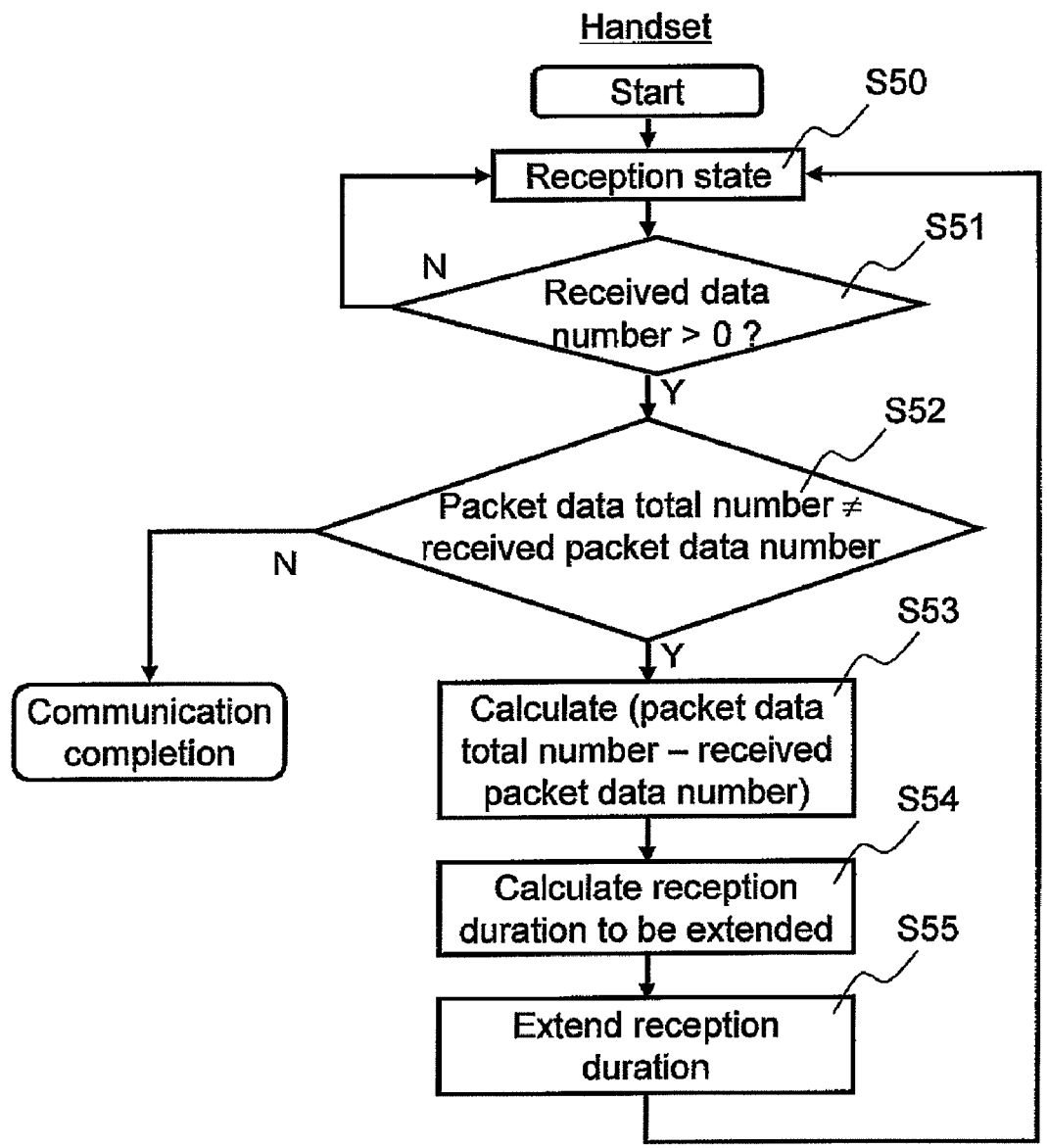
FIG. 10 is a flowchart for the handset during wireless communication between a base and a handset with the wireless communication system in Embodiment 2 of the present invention.

FIG. 10 is a flowchart of the handset 50 during wireless communication between the base 1 and the handset 50 in the wireless communication system 210 pertaining to Embodiment 2 of the present invention.

The handset 50 receives transmission data modulated into a wireless signal from the base 1 when in an intermittent reception state (S50). Upon receiving a wireless signal, the transceiver 3 of the handset 50 demodulates and successively stores this data in the data storage region 55.

The timing at which the packet data number confirmation component 51 confirms the number of the packet data received is such that it periodically confirms the number at a specific frequency while the handset 50 is in a reception state. Here, whether or not received packet data is stored in the data storage region 55 is confirmed (S51), and the number of the received packet data is acquired. The packet data number thus acquired is compared with the packet data total number included in the transmission data of the base 1 (S52), and if the packet data total number does not match the received packet data number, this difference is calculated (S53). The reception duration required to acquire packet data that currently has not been acquired is calculated from the calculated difference value and the communication baud rate between the base 1 and the handset 50 (S54), and the reception duration is extended on the basis of the calculated time (S55).

Figure 11:
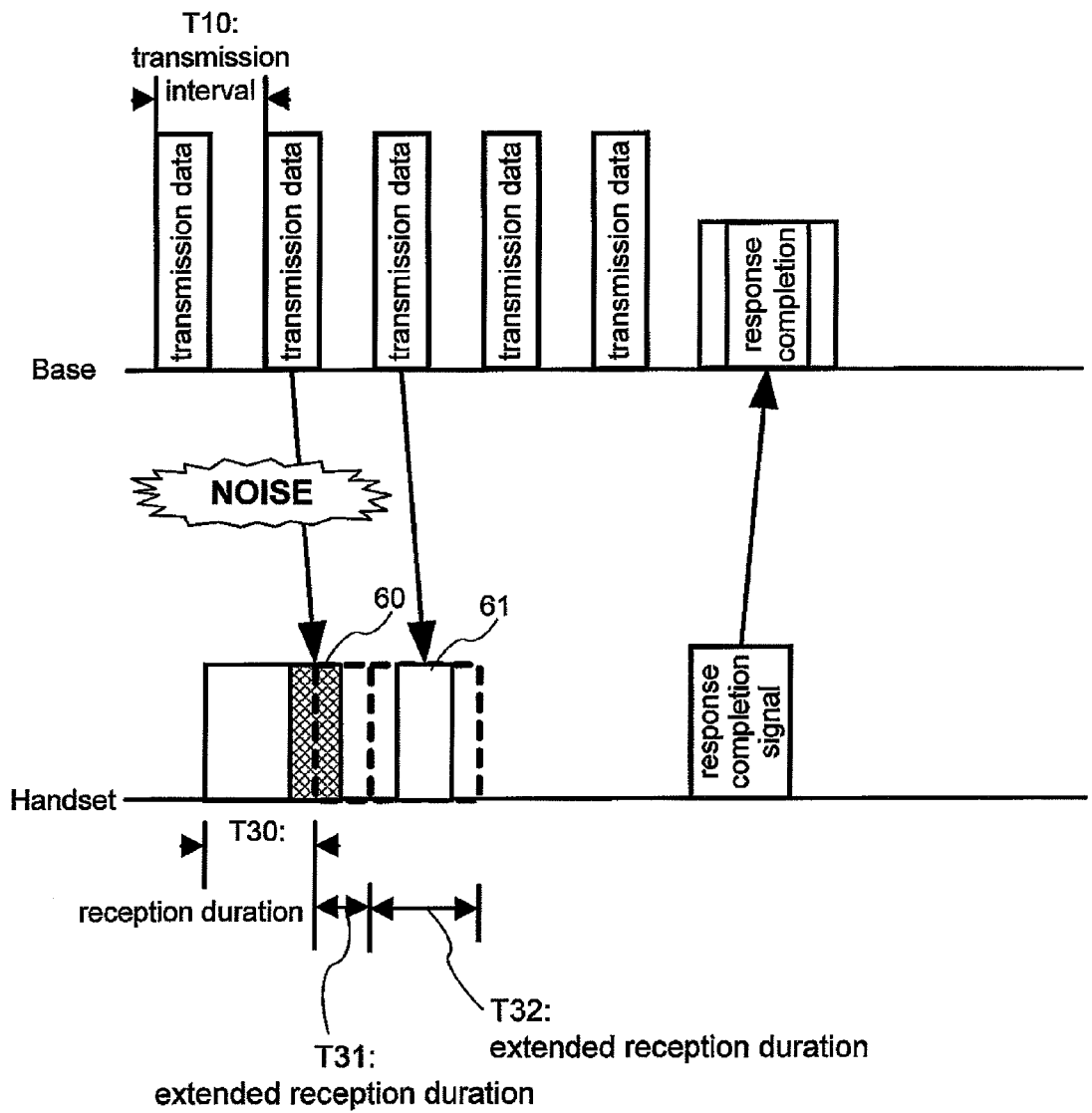
FIG. 11 is a time chart illustrating the transmission of transmission data by the base and the handset reception operation with the wireless communication system in Embodiment 2 of the present invention.

FIG. 11 is a time chart illustrating the reception operation of the handset 50 and the transmission of transmission data by the base 1 in the wireless communication system 210 in Embodiment 2 of the present invention.

The handset 50 performs a reception operation for a reception duration T30 of intermittent reception, which is predetermined as the initial value of the reception duration controller 54. When the transceiver 3 receives transmission data, which is modulated into a wireless signal, from the base 1 within this reception duration T30, the received data is demodulated and stored in the data storage region 55. The data stored in the data storage region 55 is periodically confirmed at a specific frequency by the packet data number confirmation component 51 for the reception duration T30, and if there is stored data within the reception duration T30, the packet data number thereof is confirmed. The extension time calculator 53 calculates the time it takes to acquire the packet data number corresponding to the difference between the packet data number for the stored data and the packet data total number. The reception duration controller 54 extends the reception duration so that all of the packet data, that is, the transmission data sent by the base 1, can be acquired (T31).

When all of the packet data is received, then just as in Embodiment 1, the data error detector 5 checks for errors in the data stored in the data storage region 55, and if an error 60 is detected in the data, the reception duration is further extended (T32). This is repeated until the proper data 61, in which the received data contains no errors, can be acquired. The extended reception duration T32 may be the same as the reception duration T30 of the initial value.

Furthermore, if a state of no detection of reception data continues for at least a specific length of time when the handset 50 is in a reception state in the extended reception duration T32, just as in Embodiment 1, a timeout signal is outputted by the data detector 6 and the reception operation is ended.

Also, the timing at which the above-mentioned received packet data number is checked may be such that it is checked once at a specific length of time before the end of the reception duration T30 of intermittent reception. The "specific length of time" here may, for example, be the total time taken for the processing performed by the packet data number confirmation component 51, the processing performed by the packet data number comparator 52, the processing performed by the extension time calculator 53, and the change in the reception duration by the reception duration controller 54.

Also, with the wireless communication system 210 in Embodiment 2, the reception duration T30 of intermittent reception can be set to the minimum time by making the reception duration T30 of intermittent reception the same as the transmission interval T10.

Effect of Embodiment 2

As described above, the reception duration is extended according to the difference between the packet data total number of the transmission data to be sent all at once from the base 1 and the packet data number of the reception data acquired in intermittent reception, and this prevents the reception operation of the handset 50 from ending even though the transmission data is in the midst of being received. Consequently, the reception duration of intermittent reception can be set to the required minimum, and the handset waiting time can be reduced and power consumption cut.

INDUSTRIAL APPLICABILITY

The wireless communication system pertaining to the present invention allows the time it takes until communication completion to be shortened even under the effect of external disturbance, and is useful in wireless communication systems used outdoors or in large-scale facilities, in mobile health care devices using such wireless communication systems, and so forth.

What is claimed is:

1. A wireless communication system, comprising:
   a first device configured to repeatedly transmit data within a specific transmission time; and
   a second device configured to perform intermittent reception by repeating a specific reception duration at a constant period, so as to receive the data from the first device,
   wherein the second device includes:
   a transceiver configured to transmit and receive the data transmitted to and from the first device;
   a data detector configured to detect whether or not the transceiver has received the data from the first device;
   a data error detector configured to determine whether or not there is an error in the data received by the transceiver;
   a reception duration controller configured to change the specific reception duration; and
   a time determiner configured to output a timeout signal to the reception duration controller when the data detector has not detected a reception of the data for at least a specific time,
   wherein, when the data error detector determines that there is the error in the data received by the transceiver, the reception duration controller extends the specific reception duration of the transceiver, so as to receive second data that is newly sent from the first device after the data having the error, and
   wherein the reception duration controller repeatedly extends the specific reception duration of the transceiver until the timeout determiner outputs the timeout signal to the reception duration controller or until the data error detector determines that there is no error in the second data or any data received after the data having the error.

2. The wireless communication system according to claim 1,
   wherein the reception duration controller outputs a signal that ends a reception operation of the second device to the transceiver when the timeout signal is received by the reception duration controller.

3. A wireless communication system, comprising:
   a first device configured to repeatedly transmit data within a specific transmission time; and
   a second device configured to perform intermittent reception by repeating a specific reception duration at a constant period, so as to receive the data transmitted from the first device,
   wherein the second device includes:
   a transceiver configured to transmit and receive the data to and from the first device;
   a packet data number confirmation component configured to confirm a number of packets of data included in the data received by the transceiver;
   a packet data number comparator configured to compare the number of packets of data received by the transceiver with a total number of packets of data to be sent out from the first device in a single transmission;
   an extension time calculator configured to determine an extension time of extending the specific reception duration of the transceiver by calculating a time corresponding to a difference between the number of packets of data received by the transceiver and the total number of packets of data to be sent out from the first device in the single transmission; and
   a reception duration controller configured to extend the specific reception duration according to the determined extension time.

4. The wireless communication system according to claim 3,
   wherein the second device includes a data error detector configured to determine whether or not there is an error in the data received by the transceiver, and
   wherein, when the data error detector determines that there is the error, the reception duration controller changes the specific reception duration of the transceiver, so as to receive second data that is newly sent from the first device after the data having the error.

5. The wireless communication system according to claim 3, wherein the reception duration controller sets the specific reception duration of the transceiver to a value that is the same as a transmission interval for the data sent from the first device.

6. The wireless communication system according to claim 3, wherein the extension time calculator of the second device calculates the extension time from a difference between the total number of packets of data and the number of packets of data received by the transceiver, and from a transfer rate between the first device and the second device.

7. The wireless communication system according to claim 3,
wherein the second device includes:
- a data detector configured to detect whether or not the transceiver has received the data from the first device; and
- a timeout determiner configured to output a timeout signal to the reception duration controller when the data detector has not detected a reception of the data for at least a specific time, and wherein the reception duration controller outputs a signal that ends a reception operation of the second device to the transceiver when the timeout signal is received by the reception duration controller.

8. A portable terminal apparatus, comprising:
a transceiver configured to perform intermittent reception by repeating a specific reception duration at a constant period, so as to receive data transmitted from a measurement device that repeatedly transmits the data within a specific transmission time;
a data detector configured to detect whether or not the transceiver has received the data from the first device;
a data error detector configured to determine whether or not there is an error in the data received by the transceiver;
a reception duration controller configured to change the specific reception duration; and
a timeout determiner configured to output a timeout signal to the reception duration controller when the data detector has not detected a reception of the data for at least a specific time,
wherein, when the data error detector determines that there is the error in the data received by the transceiver, the reception duration controller extends the specific reception duration of the transceiver, so as to receive second data that is newly sent from the measurement device after the data having the error, and
wherein the reception duration controller repeatedly extends the specific reception duration of the transceiver until the timeout determiner outputs the timeout signal to the reception duration controller or until the data error detector determines that there is no error in the second data or any data received after the data having the error.

9. A portable terminal apparatus, comprising:
a transceiver configured to perform intermittent reception by repeating a specific reception duration at a constant period, so as to receive data transmitted from a measurement device that repeatedly transmits the data within a specific transmission time;
a packet data number confirmation component configured to confirm a number of packets of data included in the data received by the transceiver;
a packet data number comparator configured to compare the number of packets of data received by the transceiver with a total number of packets of data to be sent out from the measurement device in a single transmission;
an extension time calculator configured to determine an extension time of extending the specific reception duration of the transceiver by calculating a time corresponding to a difference between the number of packets of data received by the transceiver and the total number of packets of data to be sent out from the measurement device in the single transmission; and
a reception duration controller configured to extend the specific reception duration according to the determined extension time.

* * * * *